US012332628B2

(12) United States Patent
Murata et al.

(10) Patent No.: US 12,332,628 B2
(45) Date of Patent: Jun. 17, 2025

(54) SETTING CODE GENERATING DEVICE, INDUSTRIAL MACHINE, SETTING CODE GENERATING METHOD, AND SETTING CODE GENERATING PROGRAM

(71) Applicant: FANUC CORPORATION, Yamanashi (JP)

(72) Inventors: Koichi Murata, Yamanashi (JP); Masato Yamamura, Yamanashi (JP); Takahiro Kouji, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 383 days.

(21) Appl. No.: 17/915,679

(22) PCT Filed: Jul. 1, 2021

(86) PCT No.: PCT/JP2021/024931
§ 371 (c)(1),
(2) Date: Sep. 29, 2022

(87) PCT Pub. No.: WO2022/009764
PCT Pub. Date: Jan. 13, 2022

(65) Prior Publication Data
US 2023/0122016 A1    Apr. 20, 2023

(30) Foreign Application Priority Data

Jul. 8, 2020   (JP) .................. 2020-117457

(51) Int. Cl.
*G05B 19/408*   (2006.01)
(52) U.S. Cl.
CPC ............ *G05B 19/4083* (2013.01); *G05B 2219/31284* (2013.01)
(58) Field of Classification Search
None
See application file for complete search history.

(56) References Cited

U.S. PATENT DOCUMENTS 9,292,611 B1    3/2016  Gysin et al.
2006/0262328 A1*  11/2006  Nose ..................... G06K 1/121
                                                              358/1.1
(Continued)

FOREIGN PATENT DOCUMENTS

CN        110809053 A    2/2020
JP        2008-124648    5/2008
(Continued)

OTHER PUBLICATIONS

International Search Report issued Sep. 7, 2021, in International (PCT) Application No. PCT/JP2021/024931, with English translation.

*Primary Examiner* — Ryan A Jarrett
(74) *Attorney, Agent, or Firm* — Wenderoth, Lind & Ponack, L.L.P.

(57) ABSTRACT

Provided are a setting code generating device, an industrial machine, a setting code generating method, and a setting code generating program capable of confirming information output externally from an industrial machine. This setting code generating device is provided with: an identification information output unit for outputting, to a display, identification information relating to an industrial machine, including machine information relating to the industrial machine and state information relating to the state of the industrial machine; a setting code generating unit for generating a setting code obtained by encoding the identification information output by the identification information output unit, on the basis of an instruction received by way of an operating unit; and a setting code output unit for outputting the setting code generated by the setting code generating unit.

11 Claims, 5 Drawing Sheets

(56) References Cited

U.S. PATENT DOCUMENTS

| | | | |
|---|---|---|---|
| 2021/0029101 A1* | 1/2021 | Igari | G06K 7/1417 |
| 2023/0095055 A1* | 3/2023 | Yamamoto | G05B 19/4063 |
| | | | 700/80 |

FOREIGN PATENT DOCUMENTS

| | | |
|---|---|---|
| JP | 2009-129227 | 6/2009 |
| JP | 2009-301481 | 12/2009 |
| JP | 2014-517709 | 7/2014 |
| JP | 2018-136741 | 8/2018 |
| JP | 2019-159569 | 9/2019 |
| JP | 2020-052938 | 4/2020 |
| WO | 2018/047313 | 3/2018 |
| WO | 2019/053899 | 3/2019 |

* cited by examiner

SETTING CODE GENERATING DEVICE, INDUSTRIAL MACHINE, SETTING CODE GENERATING METHOD, AND SETTING CODE GENERATING PROGRAM

TECHNICAL FIELD

The present invention relates to a setting code generating device, an industrial machine, a setting code generating method, and a setting code generating program.

BACKGROUND ART

In the known art, when a malfunction occurs in an industrial machine including a machine tool, an industrial robot, or the like, it is necessary to check the situation of the malfunction. In a case of occurrence of such a malfunction, it is conceivable to check the situation by outputting internal information to an external apparatus. For example, the industrial machine may be connected to a network to output the internal information to such an external apparatus or to a storage medium. For example, there has been known a controller equipped with display means and including a storage unit that stores information to be used in the case of occurrence of a malfunction in the controller, a code generation unit that generates an optical code of information stored in the storage unit, and a display control unit that displays the optical code on the display means (see Patent Document 1).

Patent Document 1: Japanese Unexamined Patent Application, Publication No. 2009-129227

DISCLOSURE OF THE INVENTION

Problems to be Solved by the Invention

Whichever of the above-described techniques is used, it has been general that internal information to be output to an external apparatus is a predetermined item, and such internal information has not been output in a visually recognizable form within an industrial machine. Furthermore, depending on the situation of a malfunction, there is a case where it desirable to add information considered necessary for investigation of a cause of the malfunction or a case where it is desirable to delete information that is not desired to be output to an external apparatus. However, there has not been a technique suitable for such cases. Therefore, a mechanism that allows for checking, on a machine side, information to be output to an external apparatus has been required.

Means for Solving the Problems (1) An aspect of the present disclosure is directed to a setting code generating device including: a specific information output unit that outputs specific information regarding an industrial machine to a display, the specific information including machine information regarding the industrial machine and state information regarding a state of the industrial machine; a setting code generation unit that generates a setting code by encoding the specific information output by the specific information output unit, based on an instruction provided via an operation unit; and a setting code output unit that outputs the setting code generated by the setting code generation unit.

(2) Another aspect of the present disclosure is directed to a setting code generating method performable by a controller that controls an industrial machine. The setting code generating method includes: a specific information output step of outputting specific information regarding the industrial machine to a display, the specific information including machine information regarding the industrial machine and state information regarding a state of the industrial machine; a setting code generation step of generating a setting code by encoding the specific information output in the specific information output step, based on the an instruction provided via an operation unit; and a setting code output step of outputting the setting code generated in the setting code generation step.

(3) Another aspect of the present disclosure is directed to a setting code generating program for causing a controller that controls an industrial machine to execute steps including: a specific information output step of outputting specific information regarding the industrial machine to a display, the specific information including machine information regarding the industrial machine and state information regarding a state of the industrial machine; a setting code generation step of generating a setting code by encoding the specific information output in the specific information output step, based on an instruction provided via an operation unit; and a setting code output step of outputting the setting code generated in the setting code generation step.

Effects of the Invention

The aspects of the present invention provide a setting code generating device, an industrial machine, a setting code generating method, and a setting code generating program that allow for checking of information to be output to an external apparatus from an industrial machine.

PREFERRED MODE FOR CARRYING OUT THE INVENTION

Embodiment

First, an outline of an embodiment of one aspect will be described. In the present embodiment, a machine tool is shown as an example of an industrial machine. The present embodiment relates to displaying an information name (hereinafter referred to also as an item) of information to be encoded and to be output to an external apparatus from a machine tool on a display unit of the machine tool, thereby enabling an operator to check the item (name) of the information. The present embodiment relates to displaying, when an operator selects an item of information that he/she wishes to encode and provide an encoding instruction, a setting code encoded on the basis of the instruction on a display unit.

Figure 1:
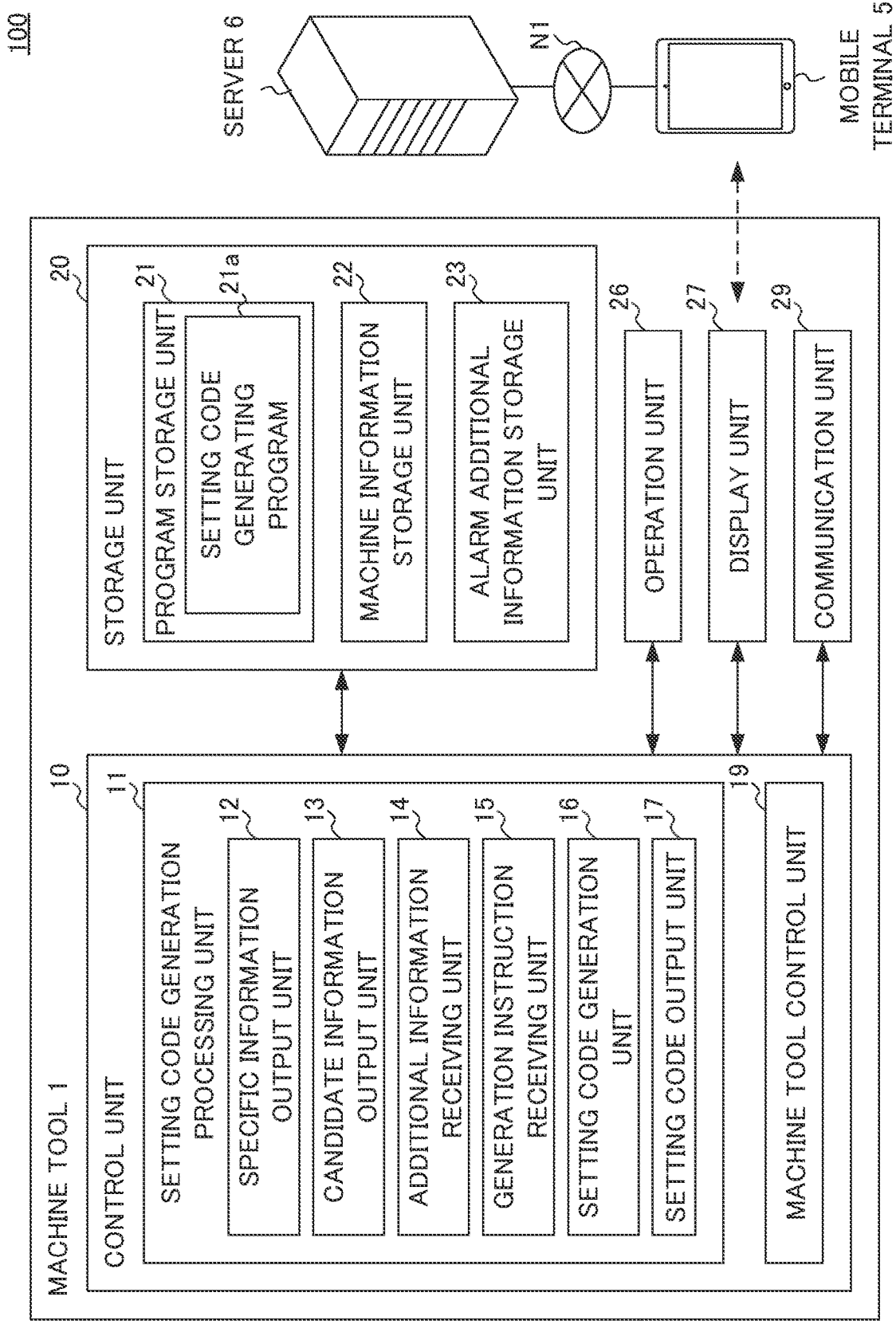
FIG. 1 illustrates an overall configuration of an information coordination system, along with a functional block diagram of a machine tool according to an embodiment.

An information coordination system 100 shown in FIG. 1 is a system in which a mobile terminal 5 reads a setting code output by a machine tool 1 and transmits information obtained from the read setting code to a server 6, thereby making it possible to transmit information regarding the machine tool 1 to the server 6. The information coordination system 100 includes the machine tool 1, the mobile terminal 5, and the server 6. The mobile terminal 5 and the server 6 are communicably connected to each other via a communication network N1. Examples of the communication network N1 include the Internet, a VPN (virtual private network), and a public telephone network. The communication network N1 may use any specific communication mode and perform either wired connection or wireless connection.

The machine tool 1 is a machining center, for example. The machine tool 1 is a machine that performs predetermined machining such as cutting on a workpiece such as a part on the basis of an operation command output by a computer numerical controller (CNC) (not shown) incorporated in the machine tool 1, for example. The machine tool 1 includes a control unit 10, a storage unit 20, an operation unit 26, a display unit 27, and a communication unit 29. Although the machine tool 1 further includes various types of devices for machining, since the machine tool 1 with such a configuration is well known to those skilled in the art, detailed description and illustration thereof are omitted herein.

The control unit 10 may be a CPU (central processing unit), and executes various types of control programs for controlling the machine tool 1 stored in the storage unit 20, to perform overall control of the machine tool 1. Before describing each of functional units of the control unit 10, the storage unit 20 will be described. The storage unit 20 is a storage area storing a program and the like executable by the control unit 10. The storage unit 20 includes a program storage unit 21, a machine information storage unit 22, and an alarm additional information storage unit 23.

The program storage unit 21 is a storage area storing various types of programs for performing processing as the machine tool 1. The program storage unit 21 stores a setting code generating program 21*a*, which is a program for executing a function of the setting code generation processing unit 11 of the control unit 10 to be described later.

The machine information storage unit 22 is a storage area storing machine information regarding the machine tool 1. The machine information storage unit 22 stores, with respect to the machine tool 1, the machine name (model name) the machine-tool builder name, the machine number as an identifier relating to the machine, and the serial number (CNC serial number) as an identifier relating to control software, for example. The machine information storage unit 22 may store a URL (uniform resource locator) for connecting to a contact address such as a help desk of the machine-tool builder of the machine tool 1.

The alarm additional information storage unit 23 is a storage area storing an alarm code for identifying alarm information regarding an alarm to be issued by the machine tool 1 and additional information in association with each other. The alarm information is state information indicating a state of the machine tool 1. The additional information includes an item of information for analysis of a cause relating to the alarm information. Examples of the additional information include control parameter information (NC parameters), a machining program (an NC program), information regarding compensation of a tool and information regarding compensation specific to a machine (offset), information regarding a control variable number (macro conversion), information regarding a history (history data), and information regarding machining and information regarding an operation (an operating time). The alarm additional information storage unit 23 stores additional information usable as a material useful for analysis of the alarm information for each alarm code in association therewith.

The control unit 10 includes the setting code generation processing unit 11 and a machine tool control unit 19. The setting code generation processing unit 11 outputs, to a display unit 27, items of information to be encoded and to be output to an external apparatus to a display unit 27 such that the items can be referenced and selected. The setting code generation processing unit 11 generates a setting code on the basis of the item displayed on the display unit 27 and selected by the operator, and outputs the setting code to the display unit 27. The setting code generation processing unit 11 includes a specific information output unit 12, a candidate information output unit 13, an additional information receiving unit 14, a generation instruction receiving unit 15, a setting code generation unit 16, and a setting code output unit 17.

The specific information output unit 12 outputs specific information to the display unit 27. The specific information includes the above-described machine information and state information. The state information may include operation status information indicating that a normal operation is being performed, for example, in addition to the above-described alarm information. The specific information output unit 12 may output the specific information to the display unit 27 in response to reception of an instruction relating to display of the specific information from the operator, for example. The specific information output unit 12 may automatically output the specific information to the display unit 27 in response to an alarm being output in an operation status of the machine tool 1, for example. The specific information output unit 12 outputs to the display unit 27 the number of characters of information corresponding to the item to be encoded.

The candidate information output unit 13 outputs to the display unit 27 items (selectable information) of a plurality of pieces of additional information as candidates for the additional information. The candidate information output unit 13 outputs the item of the additional information corresponding to the alarm information. As mentioned above, the additional information is information for analysis of a cause relating to the alarm information, and includes various types of information. For example, the candidate information output unit 13 may output items of the additional information along with checkboxes associated with and to be shown in proximity to the items of the additional information such that the operator can select one or more items of the additional information (see an additional information zone 34 shown in FIG. 3 to be described later). The additional information receiving unit 14 receives via the operation unit 26 the selection by the operator for designating item(s) to be encoded, from among the additional information output by the candidate information output unit 13.

The generation instruction receiving unit 15 receives via the operation unit 26 a setting code generation instruction as an encoding instruction provided by the operator. The setting code generation unit 16 generates, for example, a two-dimensional code, a representative example of which is a QR code (registered trademark), as a setting code in response to the generation instruction receiving unit 15 receiving the generation instruction. The setting code generation unit 16 generates a two-dimensional code by encoding the specific information and information regarding the selected item of the additional information, which are displayed on the display unit 27, and a URL designating the server 6, for example.

The setting code generation unit 16 generates the two-dimensional code of a size based on the size of a display screen of the display unit 27 and the resolution of the display screen. The storage unit 20 stores in advance information regarding the size and the resolution of the display screen. The setting code generation unit 16 may determine the size of the two-dimensional code based on the information. The setting code output unit 17 outputs to the display unit 27 the setting code generated by the setting code generation unit 16.

The operator takes a picture of the setting code displayed on the display unit 27 with the mobile terminal 5, for example. This makes it possible for the mobile terminal 5 to perform processing for reading a content of the setting code and transmitting information included in the setting code to the server 6 by communicating with the server 6.

The machine tool control unit 19 controls the machine tool 1 on the basis of a control command. The machine tool control unit 19 performs control to operate and stop a shaft driving device (not shown) of the machine tool 1 or retract the shaft driving device from a machining target. The operation unit 26 and the display unit 27 are each a display/MDI unit, for example. The display/MDI unit is a manual data input device including a display, a keyboard, and the like. A touch panel functioning as both the operation unit 26 and the display unit 27 may be provided. The communication unit 29 is an interface that communicates with another device (e.g., another machine tool).

The mobile terminal 5 is an information processing device such as a smartphone or a tablet owned by the operator. The mobile terminal 5 has general functions as the information processing device. The mobile terminal 5 includes, for example, a control unit, a storage unit, an input unit, a display unit (alternatively a touch panel functioning as both the input unit and the display unit), a communication unit, and an imaging unit for reading the setting code, which are not shown.

The server 6 is, for example, a server provided in the machine-tool builder of the machine tool 1 and having various types of information including a help function. The server 6 receives various types of information included in the setting code displayed by the machine tool 1 via the mobile terminal 5. The server 6 includes a control unit, a storage unit, a communication unit, and the like, which are not shown.

Figure 2:
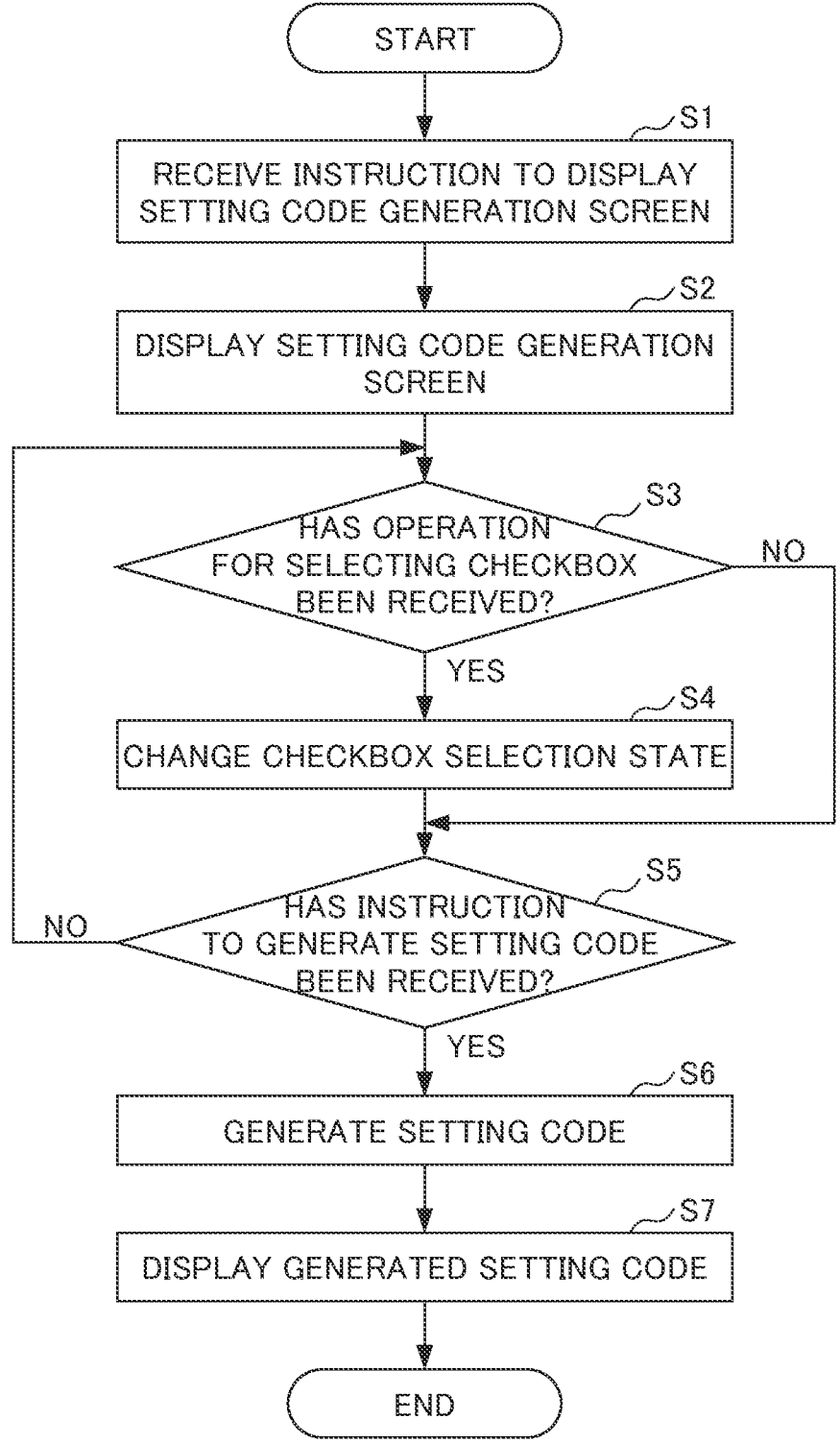
FIG. 2 is a flowchart showing setting code output processing in a machine tool according to the embodiment.

Then, processing for generating the setting code performed by the machine tool 1 according to the present embodiment will be described with reference to FIGS. 2 to 4. Referring to FIG. 2, in Step S1 (hereinafter, "Step S" is abbreviated as "S"), when the operator gives an instruction to output a setting code generation screen via a menu screen (not shown) displayed on the display unit 27, for example, the control unit 10 (the setting code generation processing unit 11) in the machine tool 1 receives the instruction to display the setting code generation screen. In S2, the control unit 10 (the specific information output unit 12 and the candidate information output unit 13) outputs the setting code generation screen to the display unit 27. The setting code generation screen will be described with reference to FIG. 3.

Figure 3:
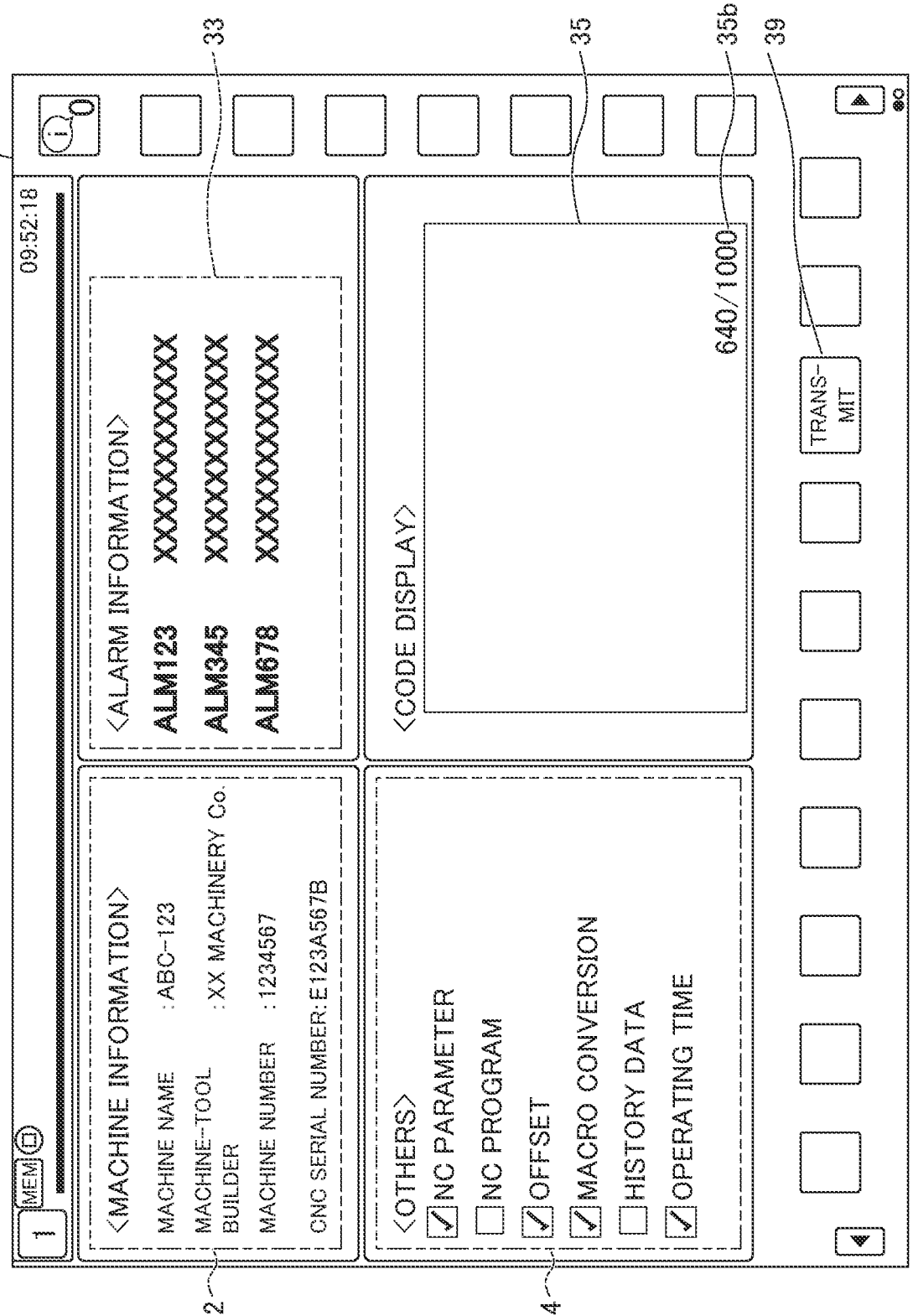
FIG. 3 is a diagram showing an example of a screen to be displayed on a display unit of the machine tool according to the embodiment.

The setting code generation screen 31 shown in FIG. 3 is a screen for generating and displaying a setting code obtained by encoding the items of information displayed thereon. The setting code generation screen 31 includes a machine information zone 32, an alarm information zone 33, an additional information zone 34, a code display zone, and a transmission button 39. The machine information zone 32 is a zone where machine information stored in the machine information storage unit 22 is displayed. In the machine information zone 32, the machine name, the machine-tool builder name, the machine number, and the CNC serial number are displayed as machine information regarding the machine tool 1. The specific information output unit 12 outputs to the machine information zone 32 the machine information stored in the machine information storage unit 22.

The alarm information zone 33 is a zone where alarm information is displayed. In the example shown in FIG. 3, alarm codes corresponding to three items of the alarm information and their contents are displayed in the alarm information zone 33. The specific information output unit 12 outputs the alarm information as state information regarding the machine tool 1 to the alarm information zone 33. The machine tool 1 can be in an operation status of normal operation case where an alarm has not been output. In this case, the alarm information zone 33 may display the operation status information.

The additional information zone 34 is a zone that displays respective names of all the items of the additional information, which includes the items of the additional information corresponding to alarm information displayed in the alarm information zone 33. The additional information zone 34 displays, as the item names of additional information stored in the alarm additional information storage unit 23, items including NC parameters, NC program, offset, macro conversion, history data, and operating time. A checkbox is shown on the left side of each of the item names of the additional information so that the operator can set on/off of the checkbox. When the setting code generation screen 31 is to be displayed, the candidate information output unit 13 refers to the alarm additional information storage unit 23, and add a checkmark to the checkbox of each item name of the additional information displayed in the additional information zone 34 and corresponding to the alarm information output to the alarm information zone 33.

The code display zone 35 is a zone where the setting code is displayed. At a stage where the setting code generation screen 31 is displayed, character number information 35b is displayed in the code display zone 35. The character number information 35b indicates the number of characters of information to be used to generate the setting code with respect to the maximum number of characters that can be included in the setting code. The maximum number of characters is determined in advance on the basis of the size of the code display zone 35 and the resolution of the display unit 27. The number of characters of information to be used to generate the setting code is the total number of characters of information including the machine information in the machine information zone 32, the alarm information in the alarm information zone 33, and the information corresponding to the names of the selected items of the additional information in the additional information zone 34. The shown example indicates that the maximum number of characters is "1000" and the number of characters of the information used to generate the setting code is "640". If the number of characters of the information to be used to generate the setting code exceeds the maximum number of characters, an alarm may be output by displaying the number in red font. The transmission button 39 is operated by the operator to give an encoding instruction.

The operator checks the setting code generation screen 31 displayed on the display unit 27, and adds or removes a checkmark to switch on/off of the checkboxes corresponding to the item names of the additional information in the additional information zone 34 as needed. In S3 in FIG. 2, the control unit 10 determines whether or not an operation for selecting the checkbox has been received. When the operation for selecting the checkbox has been received (YES in S3), the control unit 10 causes the processing to proceed to S4. On the other hand, when the operation for selecting the check box has not been received (NO in S3), the control unit 10 causes the processing to proceed to S5. In S4, the control unit 10 changes a selection state (on or off) of the checkbox depending on the operation for selection.

At the time of generation of the setting code generation screen 31, the setting code generation processing unit 11 switch in advance on the checkbox of an item name of additional information required for analysis of a cause of alarm information. However, in a case where the operator wishes not to output the additional information, the operator switches the checkbox, whereby the operator is allowed to select the item names of the additional information to be output to an external apparatus. On the contrary, in a case where the operator wishes to output the additional information of an item name whose checkbox does not have a checkmark, the operator has to simply add a checkmark to the checkbox.

Next, when the transmission button 39 in the setting code generation screen 31 is selectively operated by the operator, the control unit 10 (the generation instruction receiving unit 15) determines whether or not a setting code generation instruction has been received in S5. When the setting code generation instruction has been received (YES in S5), the control unit 10 causes the processing to proceed to S6. On the other hand, when the setting code generation instruction has not been received (NO in S5), the control unit 10 causes the processing to proceed to S3.

In S6, the control unit 10 (the setting code generation unit 16) generates a setting code. At this stage, the control unit 10 may generate a code of a size based on the size of the code display zone 35 and the resolution of the display unit 27. In S7, the control unit 10 (the setting code output unit 17) displays the generated setting code on the display unit 27. More specifically, the control unit 10 outputs the setting code to the code display zone 35 in the setting code generation screen 31. Thereafter, the control unit 10 (the setting code generation processing unit 11) ends the processing.

Figure 4:
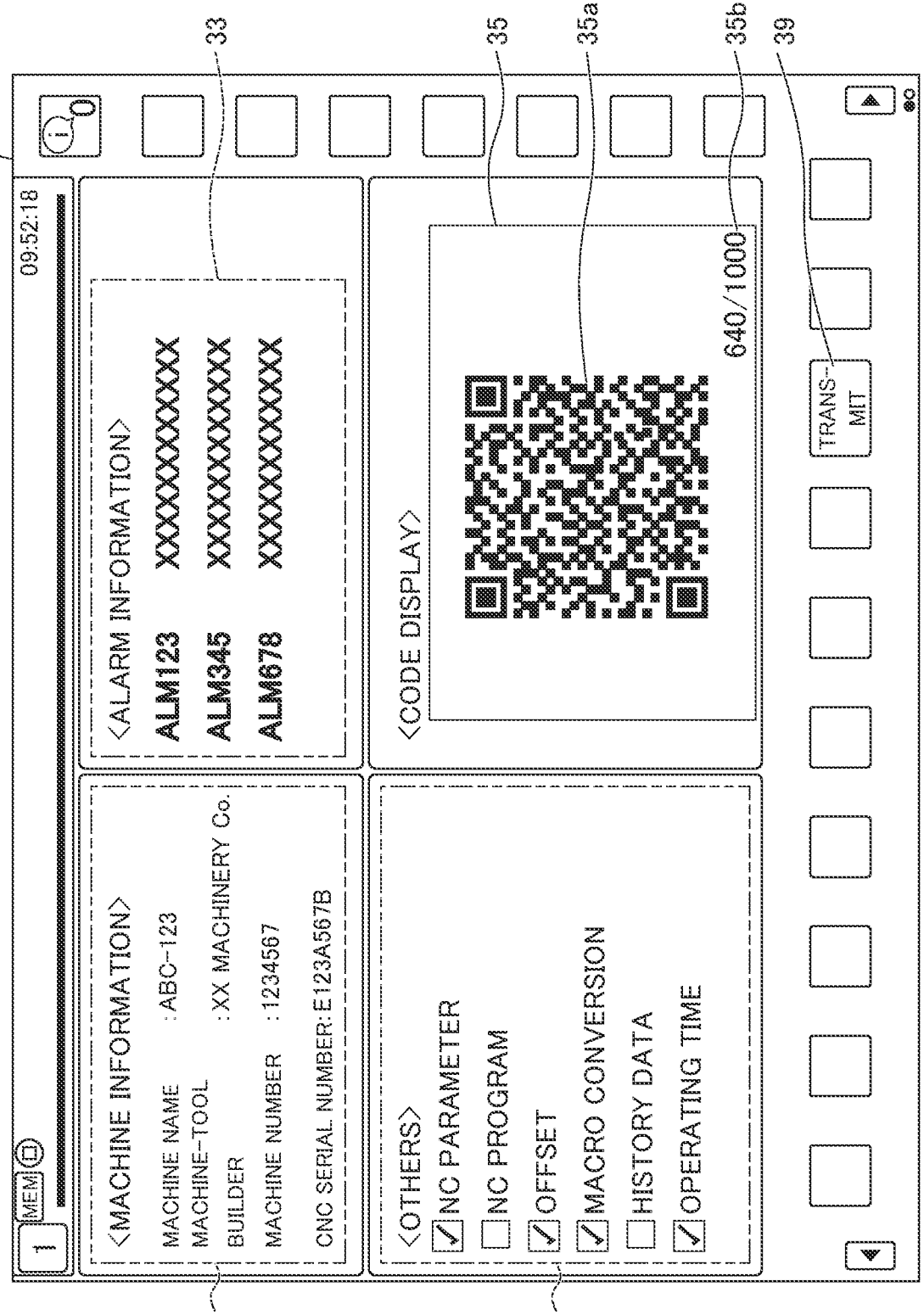
FIG. 4 is a diagram showing an example of a screen to be displayed on a display unit of the machine tool according to the embodiment.

FIG. 4 shows an example of a setting code generation screen 41 on which a two-dimensional code is displayed as the setting code by the processing in S7 shown in FIG. 3. A two-dimensional code 35a is further output to a code display zone 35 of the setting code generation screen 41. The two-dimensional code 35a is a code of a size based on the size of the code display zone 35. The two-dimensional code 35a is obtained by dynamically changing the size of the setting code to be displayed on the screen depending on an information amount (the number of characters) of information before encoding. The two-dimensional code 35a includes the machine information and the alarm information displayed on the setting code generation screen 41 and respective item names of additional information with checkmarks in the checkboxes.

As described above, the machine tool 1 outputs to the setting code generation screen 31 identification information regarding information to be output to an external apparatus from the machine tool 1. According to the known art, in a case where a device that outputs a setting code is provided, information to be output to an external apparatus from a machine tool 1 cannot be checked until the information is displayed on a mobile terminal 5 which has read a setting code output to the device. In contrast, according to the present embodiment, the operator can check which information is to be encoded for output to an external apparatus by visually checking the display unit 27 of the machine tool 1. Accordingly, the operator's anxiety can be eliminated in an early stage. Since the additional information includes information for analysis of a cause relating to alarm information associated with the alarm information, the encoded setting code includes information for analysis of cause relating to the alarm information. Therefore, the cause relating to the alarm information can be easily analyzed from the information included in the setting code. Further, in a case where the operator wishes not to output information to an external apparatus despite the information being for analysis of the cause relating to the alarm information associated with the alarm information, the operator can adjust the information by way of the selection operation.

A program for use in the present embodiment can be stored in various types of non-transitory computer readable media and can be supplied to a computer. The non-transitory computer readable media include various types of tangible storage media. Examples of the non-transitory computer readable medium include a magnetic recording medium (e.g., a flexible disk, a magnetic tape, or a hard disk drive), a magneto-optical recording medium (e.g., a magneto-optical disk), a CD-ROM (read only memory), a CD-R, a CD-R/W, a semiconductor memory (e.g., a mask ROM, a PROM (programmable ROM), an EPROM (erasable PROM), a flash ROM, and a RAM (random access memory)). The program may be supplied to a computer by various types of transitory computer readable media. Examples of the transitory computer readable medium include an electric signal, an optical signal, and an electromagnetic wave. The transitory computer readable medium can supply the program to the computer via a wired communication path such as an electrical wire and an optical fiber or a wireless communication path.

Although the above-described embodiment is one of preferred embodiments of the present invention, the scope of the invention is not limited to the above-described embodiment, but various modifications can be made without departing from the spirit of the invention.

(Modification 1)

Figure 5:
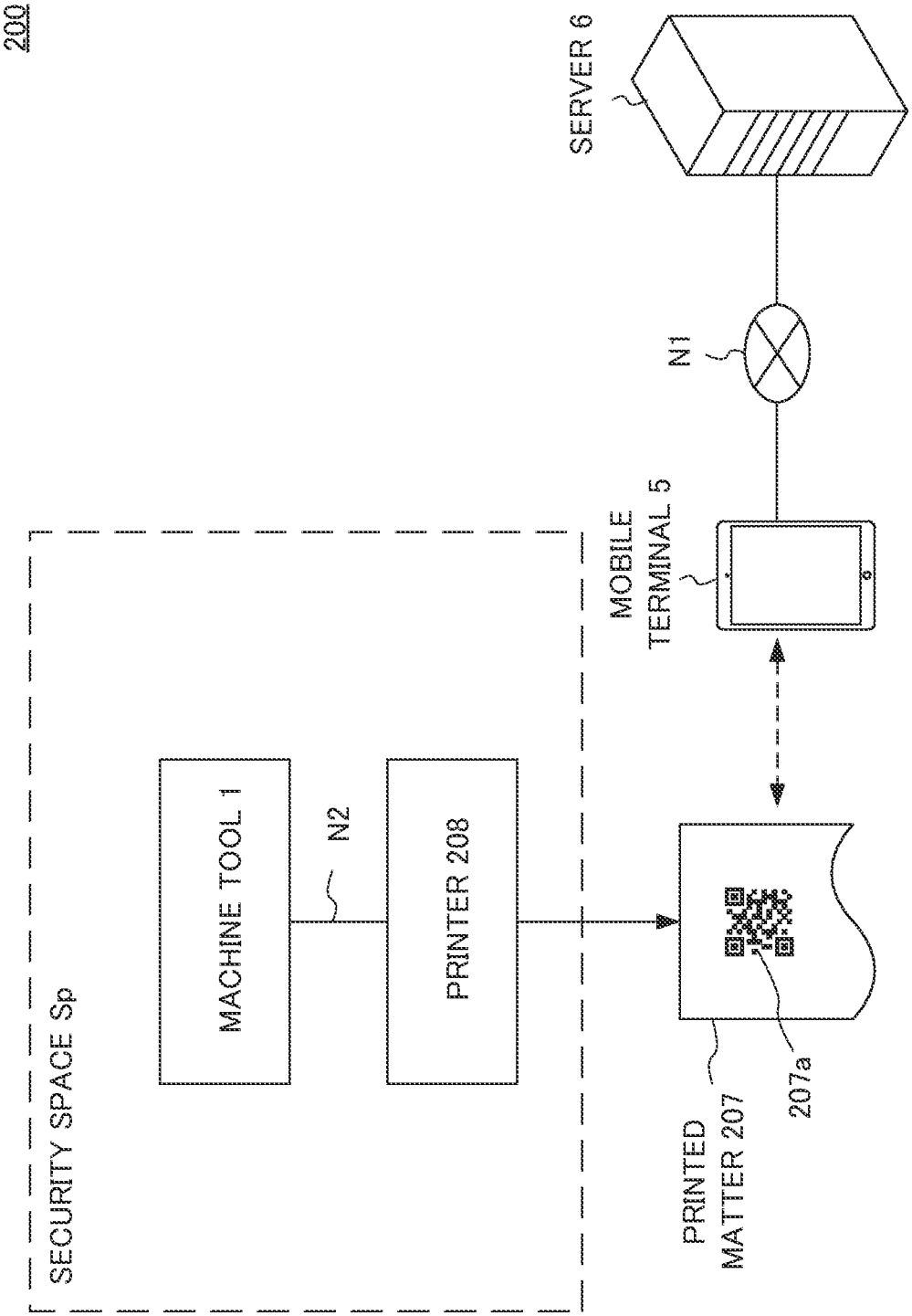
FIG. 5 is a diagram illustrating an overall configuration of an information coordination system according to a modification.

While the above embodiment has been described based on the example in which the machine tool 1 displays the setting code on the display unit 27 of the machine tool 1, the present invention is not limited thereto. For example, the setting code may be output to and printed by a printing device. FIG. 5 is a diagram showing an overall configuration of an information coordination system 200 according to a modification. The information coordination system 200 includes a machine tool 1, a mobile terminal 5, a server 6, and a printer 208 (printing device).

The machine tool 1 and the printer 208 are provided in a security space Sp. The security space Sp is a zone where the mobile terminal 5 is not permitted, for example. The machine tool 1 and the printer 208 are communicably connected to each other via a communication network N2. The communication network N2 is a LAN (local area network), for example, and may include a network switch or the like. When a setting code output unit 17 of the machine tool 1 outputs a generated setting code to the printer 208, the printer 208 outputs printed matter 207 having a two-dimensional code 207a printed thereon. An operator can use the mobile terminal 5 to read the two-dimensional code 207a on the printed matter 207 after bringing the printed matter 207 out of the security space Sp.

Thus, even in the case where the machine tool 1 is installed in a high-security site where the mobile terminal 5 is not permitted, such as the security space Sp, the setting code is output to the printer 208 connected via the communication network N2, whereby the mobile terminal 5 can read the setting code just like the case where the setting code is displayed on the display unit 27. Since the printer 208 prints the setting code, it is not necessary to be concerned about the size and the resolution of a display screen of the display unit 27 of the machine tool 1. Although the printer 208 is provided in the security space Sp in this example, the printer 208 may of course be provided outside the security space Sp.

(Modification 2)

While the above embodiment has been described based on the example in which the setting code is output to the code display zone 35, the present invention is not limited thereto. In particular, when the display screen of the display unit 27 is small, for example, a screen only for the setting code may be output to the display unit 27. In this case, it is convenient to provide a switching button by means of which a screen on which a machine information zone 32 or the like is displayed and a screen only for the setting code are switched.

(Modification 3)

While the above embodiment has been described based on the example in which the item name of the additional information associated with the alarm information is output to the display unit 27 with a checkmark in the checkbox corresponding to the item name of the additional information after displaying all the item names of the additional information, the present invention is not limited thereto. Only an item name of additional information associated with alarm information may be output to a display unit 27 with a checkmark in a checkbox corresponding to the item name of the additional information. Accordingly, an operator can check, at a glance, the item name of the additional information required to analyze a cause of the alarm information.

(Modification 4)

In the above-described embodiment, the machine tool has been described as an example of an industrial machine. While the machine tool described above is integrated with the numerical controller, the present invention is not limited thereto. A machine tool and a numerical controller may be separate from each other. In this case, a display unit provided to the numerical controller may display information included in generation of a setting code and the generated setting code. The machine tool may be replaced with an industrial robot.

(Modification 5)

Although the setting code generation screen has been described with reference to FIGS. 3 and 4 as an example in the above-described embodiment, the present invention is not limited thereto. A layout or the like may be changed in correspondence to a shape of a display in each device. Although the example in which the checkbox is shown in proximity to the item name of the additional information has been described as an example, the present invention is not limited thereto. For example, a display color of an item name may be changed by on-off.

(Modification 6)

While the above embodiment has been described based on the example in which various types of data are stored in the storage unit 20 in the machine tool 1, the present invention is not limited thereto. A configuration of a distributed system may be adopted. For example, a configuration may be adopted in which some or all of data and the like storable in the storage unit 20 of the machine tool 1 are stored in a virtual server generated in another device or a cloud communicable via a network and in which the functions of the machine tool 1 as the whole are performed by the plurality of devices.

(Modification 7)

While the setting code of the above-described embodiment includes the URL of the server 6, the present invention is not limited thereto. The setting code does not have to include the URL of the server 6.

As described above, according to the present embodiment, the following effects are obtained, for example.

(1) A machine tool 1 includes a specific information output unit 12 that outputs specific information regarding the machine tool 1 to a display unit 27, the specific information including machine information and state information regarding a state of the machine tool 1; a setting code generation unit 16 that generates a setting code by encoding the specific information output by the specific information output unit 12, based on an instruction provided via an operation unit 26; and a setting code output unit 17 that outputs the setting code generated by the setting code generation unit 16.

Due to this feature, the machine tool 1 displays on the display unit 27 the specific information including the machine information and the state information, thereby making it possible for an operator to check the specific information displayed on the display unit 27 and recognize that the displayed information is encoded. The output setting code is then read with a mobile terminal 5, thereby making it possible to transmit a content of the setting code from the mobile terminal 5 to a server 6, for example.

(2) The machine tool 1 described in (1) may further include an additional information receiving unit 14 that receives a name of additional information regarding the machine tool 1 via the operation unit 26, and the setting code generation unit 16 may generate the setting code by further encoding information regarding the name of the additional information received by the additional information receiving unit 14, based on an instruction provided via the operation unit 26. Due to this feature, the machine tool 1 receives the additional information and generates the setting code further including the received additional information, thereby making it possible to encode information desired to be encoded in addition to the specific information.

(3) In the machine tool 1 described in (2) may further include a candidate information output unit 13 that outputs, to the display unit 27, a plurality of pieces of selectable information as candidates for the additional information. The additional information receiving unit 14 may receive one or more pieces of selectable information from among the plurality of pieces of the selectable information output by the candidate information output unit 13 via the operation unit 26, and the setting code generation unit 16 may generate the setting code by further encoding the additional information corresponding to the one or more pieces of the selectable information received by the additional information receiving unit 14, based on an instruction provided via the operation unit 26. Due to this feature, the machine tool 1 outputs the plurality of pieces of the selectable information as candidates for the additional information and receives the additional information when the operator selects the additional information, thereby making it easy to receive the additional information.

(4) In the machine tool 1 described in (3), the state information may be information regarding an alarm, and the candidate information output unit 13 may output a list of information for analysis of a cause relating to the information regarding the alarm, which corresponds to the state information, as candidates for the additional information. Due to this feature, the machine tool 1 sets the candidates for the additional information to be output together with alarm information to a name of the information for analyzing the cause relating to the alarm information, thereby making it possible to include the information for analysis of the cause of the alarm in information to be encoded. As a result, at an information transmission destination, the cause of the alarm in the machine tool 1 can be easily analyzed using the content of the code.

(5) In the machine tool 1 described in any one of (2) to (4), the additional information regarding the machine tool 1 may include at least one selected from control parameter information, a machining program, information regarding compensation of a tool, information regarding compensation specific to a machine, information regarding a control variable number, information regarding a history, information regarding machining, and information regarding an operation. This feature makes it possible to include various types of information in the additional information regarding the machine tool 1.

(6) In the machine tool 1 described in any one of (1) to (5), the machine information regarding the machine tool 1 may include at least one selected from a model name, a tool builder name, an individual identifier associated with a machine, and an individual identifier relating to control software. This feature makes it possible to include various types of information in the machine information regarding the machine tool 1.

(7) In the machine tool 1 described in any one of (1) to (6), the state information regarding the machine tool 1 may include information regarding an operation status. This feature makes it possible to output the operation status information as the state information in a normal case where the alarm has not been output.

(8) In the machine tool 1 described in any one of (1) to (7), the setting code generation unit 16 may generate the setting code of a size based on a size and/or a resolution of a display screen of the display unit 27. This feature makes it possible for the machine tool 1 to generate and display a setting code of a size corresponding to information regarding hardware of the display unit 27.

(9) In the machine tool 1 described in any one of (1) to (8), the setting code output unit 17 may output the setting code to the display unit 27, and the specific information output unit 12 may further output the number of characters of information for use to generate the setting code, and a maximum number of characters that can be included in the setting code based on the size of a display screen of the display unit 27. This feature makes it possible for the operator to check whether or not information that he/she wishes to encode is within an allowable range of the number of characters with which the setting code can be generated, while performing an encoding task.

(10) In the machine tool 1 described in any one of (1) to (7), the machine tool 1 may be communicably connected to a printer 208, and the setting code output unit 17 may output the setting code to the printer 208. Due to this feature, even in an environment where the mobile terminal 5 cannot read a two-dimensional code displayed on the display unit 27 in the machine tool 1, a two-dimensional code 207a output to printed matter 207 can be read, thereby making it possible to enhance convenience.

(11) In the machine tool 1 described in any one of (1) to (10), the setting code generation unit 16 may generate a two-dimensional code as the setting code. This feature allows the mobile terminal 5 to easily read the setting code.

(12) A code generating method performable by a machine tool 1 includes: a specific information output step of outputting specific information regarding the machine tool 1 to a display unit 27, the specific information including machine information regarding the machine tool 1 and state information regarding a state of the machine tool 1; a setting code generation step of generating a setting code by encoding the specific information output in the specific information output step, based on an instruction provided via an operation unit 26; and a setting code output step of outputting the setting code generated in the setting code generation step. This feature exerts the same or similar effect to that in (1).

(13) A setting code generating program 21a causes a machine tool 1 to execute steps including: a specific information output step of outputting specific information regarding the machine tool 1 to a display unit 27, the specific information including machine information regarding the machine tool 1 and state information regarding a state of the machine tool 1; a setting code generation step of generating a setting code by encoding the specific information output in the specific information output step, based on an instruction provided via an operation unit 26, and a setting code output step of outputting the setting code generated in the setting code generation step. This feature exerts the same or similar effect to that in (1).

EXPLANATION OF REFERENCE NUMERALS

1: machine tool (setting code generating device)
5: mobile terminal
6: server
10: control unit
11: setting code generation processing unit
12: specific information output unit
13: candidate information output unit
14: additional information receiving unit
15: generation instruction receiving unit
16: setting code generation unit
17: setting code output unit
20: storage unit
21a: setting code generating program
22: machine information storage unit
23: alarm additional information storage unit
26: operation unit
27: display unit (display)
31, 41: setting code generation screen
32: machine information zone
33: alarm information zone
34: additional information zone
35: code display zone
35a, 207a: two-dimensional code
35b: character number information
39: transmission button
100, 200: information coordination system
207: printed matter
208: printer (printing device)

The invention claimed is:

1. A setting code generating device comprising:
a specific information output unit that outputs specific information regarding an industrial machine to a display, the specific information including machine information regarding the industrial machine and state information regarding a state of the industrial machine;
a candidate information output unit that outputs, to the display, a plurality of pieces of selectable information in which a name of additional information regarding the industrial machine are associated with selection part whose selection state can be changed by an operation unit;
an additional information receiving unit that receives pieces of the selectable information in a state in which the selection part is selected via the operation unit from the plurality of pieces of the selectable information output by the candidate information output unit;
a setting code generation unit that generates a setting code by encoding the specific information output by the specific information output unit and information related to the name of the additional information corresponding to pieces of the selectable information in a state in which the selection part is selected and received by the additional information receiving unit, based on an instruction provided via the operation unit; and
a setting code output unit that outputs the setting code generated by the setting code generation unit,
the state information is information regarding an alarm, and
the candidate information output unit outputs pieces of the selectable information including the name of the additional information necessary for analyzing the cause related to the information on the alarm corresponding to the additional information to the display, in a state in which the corresponding selection part is preselected.

2. The setting code generating device according to claim 1, wherein
the additional information regarding the industrial machine includes at least one selected from control parameter information, a machining program, information regarding compensation of a tool, information regarding compensation specific to a machine, information regarding a control variable number, information regarding a history, information regarding machining, and information regarding operation.

3. The setting code generating device according to claim 1, wherein
the machine information regarding the industrial machine includes at least one selected from a model name, a tool builder name, an individual identifier relating to a machine, and an individual identifier relating to control software.

4. The setting code generating device according to claim 1, wherein
the state information regarding the industrial machine includes information regarding an operation status.

5. The setting code generating device according to claim 1, wherein
the setting code generation unit generates the setting code of a size based on a size and/or a resolution of a display screen of the display.

6. The setting code generating device according to claim 1, wherein
the setting code output unit outputs the setting code to the display, and
the specific information output unit further outputs a number of characters of information for use to generate the setting code, and a maximum number of characters that can be included in the setting code based on the size of a display screen of the display.

7. The setting code generating device according to claim 1, wherein
the setting code generating device is communicably connected to a printing device, and
the setting code output unit outputs the setting code to the printing device.

8. The setting code generating device according to claim 1, wherein
the setting code generation unit generates a two-dimensional code as the setting code.

9. An industrial machine comprising the setting code generating device according to claim 1.

10. A setting code generating method performable by a controller that controls an industrial machine, the setting code generating method comprising:
a specific information output step of outputting specific information regarding the industrial machine to a display, the specific information including machine information regarding the industrial machine and state information regarding a state of the industrial machine;
a candidate information output step of outputting, to the display, a plurality of pieces of selectable information in which a name of additional information regarding the industrial machine are associated with selection part whose selection state can be changed by an operation unit;
an additional information receiving step of receiving pieces of the selectable information in a state in which the selection part is selected via the operation unit from the plurality of pieces of the selectable information output by the candidate information output step;
a setting code generation step of generating a setting code by encoding the specific information output in the specific information output step and information related to the name of the additional information corresponding to pieces of the selectable information in a state in which the selection part is selected and received by the additional information receiving step, based on an instruction provided via the operation unit; and
a setting code output step of outputting the setting code generated in the setting code generation step,
the state information is information regarding an alarm, and
the candidate information output step of outputting pieces of the selectable information including the name of the additional information necessary for analyzing the cause related to the information on the alarm corresponding to the additional information to the display, in a state in which the corresponding selection part is preselected.

11. A non-transitory computer readable medium configured to store a setting code generating program for causing a controller that controls an industrial machine to execute steps comprising:
a specific information output step of outputting specific information regarding the industrial machine to a display, the specific information including machine information regarding the industrial machine and state information regarding a state of the industrial machine;
a candidate information output step of outputting, to the display, a plurality of pieces of selectable information in which a name of additional information regarding the industrial machine are associated with selection part whose selection state can be changed by an operation unit;

an additional information receiving step of receiving pieces of the selectable information in a state in which the selection part is selected via the operation unit from the plurality of pieces of the selectable information output by the candidate information output step;

a setting code generation step of generating a setting code by encoding the specific information output in the specific information output step and information related to the name of the additional information corresponding to pieces of the selectable information in a state in which the selection part is selected and received by the additional information receiving step, based on an instruction provided via the operation unit; and a setting code output step of outputting the setting code generated in the setting code generation step, the state information is information regarding an alarm, and the candidate information output step of outputting pieces of the selectable information including the name of the additional information necessary for analyzing the cause related to the information on the alarm corresponding to the additional information to the display, in a state in which the corresponding selection part is preselected.

\* \* \* \* \*